(12) United States Patent
Cao et al.

(10) Patent No.: US 11,074,246 B2
(45) Date of Patent: Jul. 27, 2021

(54) CLUSTER-BASED RANDOM WALK PROCESSING

(71) Applicant: Advanced New Technologies Co., Ltd., Grand Cayman (KY)

(72) Inventors: Shaosheng Cao, Hangzhou (CN); Xinxing Yang, Hangzhou (CN); Jun Zhou, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/805,079

(22) Filed: Feb. 28, 2020

(65) Prior Publication Data

US 2020/0201844 A1 Jun. 25, 2020

Related U.S. Application Data

(63) Continuation of application No. PCT/CN2018/107308, filed on Sep. 25, 2018.

(30) Foreign Application Priority Data

Nov. 17, 2017 (CN) .......................... 201711144728.1

(51) Int. Cl.
*G06F 16/23* (2019.01)
*G06F 16/22* (2019.01)
(52) U.S. Cl.
CPC ...... *G06F 16/2379* (2019.01); *G06F 16/2264* (2019.01)
(58) Field of Classification Search
CPC .......................... G06F 16/9024; G06F 16/951
See application file for complete search history.

(56) References Cited

U.S. PATENT DOCUMENTS 7,778,945 B2 8/2010 Gunawardana et al.
9,852,231 B1 * 12/2017 Ravi ........................ G06N 5/02
(Continued)

FOREIGN PATENT DOCUMENTS

CN 105741175 7/2016
CN 106127301 11/2016
(Continued)

OTHER PUBLICATIONS

Extended European Search Report in European Application No. 18878726.1, dated Jun. 23, 2020, 12 pages.
(Continued)

*Primary Examiner* — Mohammad S Rostami
(74) *Attorney, Agent, or Firm* — Fish & Richardson P.C.

(57) ABSTRACT

Implementations of the present specification disclose method, apparatus, and device for processing graph data using a random walk-based process. The process is applicable to either a cluster of machines, a stand-alone machine, or both. In one aspect, the method includes: obtaining, by a cluster, data describing a graph that has nodes and edges between the nodes, wherein the cluster comprises (i) a server cluster that includes a plurality of server machines and (ii) a working machine cluster that includes a plurality of working machines; generating a two-dimensional array based on the data, wherein generating the two-dimensional array comprises generating, for each node included in the graph, a row comprising respective identifiers of adjacent nodes of the node; and generating, based on the two-dimensional array, a random sequence that represents a random walk processing of the data by the cluster.

15 Claims, 7 Drawing Sheets

(56) References Cited

U.S. PATENT DOCUMENTS

| | | | |
|---|---|---|---|
| 2008/0034074 A1 | 2/2008 | Becker | |
| 2009/0043797 A1* | 2/2009 | Dorie | G06F 16/355 |
| 2009/0083222 A1* | 3/2009 | Craswell | G06F 16/951 |
| 2012/0096042 A1* | 4/2012 | Brockett | G06F 16/24534 |
| | | | 707/798 |
| 2013/0231862 A1 | 9/2013 | Delling et al. | |
| 2015/0006486 A1* | 1/2015 | Lin | G06F 16/275 |
| | | | 707/634 |
| 2015/0006531 A1* | 1/2015 | Deshpande | G06F 16/783 |
| | | | 707/737 |
| 2016/0117358 A1 | 4/2016 | Schmid et al. | |
| 2017/0083507 A1* | 3/2017 | Ho | G06N 3/08 |
| 2017/0091334 A1* | 3/2017 | Kabiljo | G06F 16/24578 |
| 2017/0161619 A1 | 6/2017 | Franceschini et al. | |
| 2017/0249340 A1* | 8/2017 | Okuda | G06K 9/00677 |
| 2017/0316591 A1 | 11/2017 | Viswanathan et al. | |
| 2019/0065612 A1* | 2/2019 | Kenthapadi | G06Q 10/10 |
| 2019/0066054 A1* | 2/2019 | Kenthapadi | G06F 16/435 |
| 2019/0114362 A1* | 4/2019 | Subbian | G06F 16/24578 |
| 2019/0114373 A1* | 4/2019 | Subbian | G06F 16/951 |

FOREIGN PATENT DOCUMENTS

| | | |
|---|---|---|
| CN | 106530097 | 3/2017 |
| CN | 106874080 | 6/2017 |
| CN | 107145977 | 9/2017 |
| CN | 107179940 | 9/2017 |
| CN | 108021610 | 5/2018 |
| CN | 108073687 | 5/2018 |
| EP | 2963564 | 1/2016 |
| EP | 3654207 | 5/2020 |
| TW | I440348 | 6/2014 |
| TW | I532976 | 5/2016 |

OTHER PUBLICATIONS mathematica.stackexchange.com [online], "Manipulate-Generate Random Walk on a Graph—Mathematica Stack Exchange", Sep. 27, 2017, retrieved on Jun. 24, 2020, retrieved from URL <https://mathematica.stackexchange.com/questions/156626/generate-random-walk-on-a-graph>, 4 pages.

International Preliminary Report on Patentability in International Application No. PCT/CN2018/107308, dated May 19, 2020, 5 pages (with Partial English translation).

Crosby et al., "BlockChain Technology: Beyond Bitcoin," Sutardja Center for Entrepreneurship & Technology Technical Report, Oct. 16, 2015, 35 pages.

International Search Report and Written Opinion in PCT Appln. No. PCT/CN2018/107308, dated Jan. 7, 2019, 9 pages (with English translation of search report).

Nakamoto, "Bitcoin: A Peer-to-Peer Electronic Cash System," www.bitcoin.org, 2005, 9 pages.

* cited by examiner

CLUSTER-BASED RANDOM WALK PROCESSING

CROSS-REFERENCE TO RELATED APPLICATIONS

This application is a continuation of PCT Application No. PCT/CN2018/107308, filed on Sep. 25, 2018, which claims priority to Chinese Patent Application No. 201711144728.1, filed on Nov. 17, 2017, and each application is hereby incorporated by reference in its entirety.

TECHNICAL FIELD

The present specification relates to the field of computer software technologies, and in particular, to a random walk method, apparatus, and device, and a cluster-based random walk method, apparatus, and device.

BACKGROUND

With the rapid development of computer and Internet technologies, many businesses can be performed online. Graph computing is a common method for processing an online business in the social area.

For example, for account fraud identification in a social risk control business: each user serves as a node. If there is a transfer relationship between two users, there is an edge between two corresponding nodes, and a direction of the edge can be undefined, or can be defined based on a transfer direction. By analogy, graph data including multiple nodes and multiple edges can be obtained, and then graph computing is performed based on the graph data, to implement risk control.

A random walk algorithm is a basic and important part in graph computing, and supports upper-layer complex algorithms. In the existing technology, the following random walk algorithm is generally used: A node included in graph data is randomly read from a database, and then an adjacent node thereof is further read from the database, and so on, to implement random walk in the graph data.

Based on the existing technology, a more efficient random walk solution applicable to large-scale graph data is needed.

SUMMARY

Implementations of the present specification provide a random walk method, apparatus, and device, and a cluster-based random walk method, apparatus, and device, to resolve the following technical problem: A more efficient random walk solution applicable to large-scale graph data is needed.

To resolve the technical problem, the implementations of the present specification are implemented as follows:

An implementation of the present specification provides a cluster-based random walk method, including: obtaining, by a cluster, information about each node included in graph data; generating a two-dimensional array based on the information about each node, where each row of the two-dimensional array includes respective identifiers of adjacent nodes of the node; and generating a random sequence based on the two-dimensional array, where the random sequence reflects random walk in the graph data.

An implementation of the present specification provides a random walk method, including: obtaining a two-dimensional array generated based on information about each node included in graph data, where each row of the two-dimensional array includes respective identifiers of adjacent nodes of the node; and generating a random sequence based on the two-dimensional array, where the random sequence reflects random walk in the graph data.

An implementation of the present specification provides a cluster-based random walk apparatus, where the apparatus belongs to a cluster and includes: an acquisition module, configured to obtain information about each node included in graph data; a first generation module, configured to generate a two-dimensional array based on the information about each node, where each row of the two-dimensional array includes respective identifiers of adjacent nodes of the node; and a second generation module, configured to generate a random sequence based on the two-dimensional array, where the random sequence reflects random walk in the graph data.

An implementation of the present specification provides a random walk apparatus, including: an acquisition module, configured to obtain a two-dimensional array generated based on information about each node included in graph data, where each row of the two-dimensional array includes respective identifiers of adjacent nodes of the node; and a generation module, configured to generate a random sequence based on the two-dimensional array, where the random sequence reflects random walk in the graph data.

An implementation of the present specification provides a cluster-based random walk device, where the device belongs to a cluster and includes: at least one processor; and a memory in communication with the at least one processor, where the memory stores instructions that can be executed by the at least one processor, and the instructions are executed by the at least one processor to enable the at least one processor to: obtain information about each node included in graph data; generate a two-dimensional array based on the information about each node, where each row of the two-dimensional array includes respective identifiers of adjacent nodes of the node; and generate a random sequence based on the two-dimensional array, where the random sequence reflects random walk in the graph data.

An implementation of the present specification provides a random walk device, including: at least one processor; and a memory in communication with the at least one processor, where the memory stores instructions that can be executed by the at least one processor, and the instructions are executed by the at least one processor to enable the at least one processor to: obtain a two-dimensional array generated based on information about each node included in graph data, where each row of the two-dimensional array includes respective identifiers of adjacent nodes of the node; and generate a random sequence based on the two-dimensional array, where the random sequence reflects random walk in the graph data.

The at least one technical solution used in the implementations of the present specification can achieve the following beneficial effects: The solution helps reduce access to a database where original graph data is stored. It is unnecessary to rely on the database after a two-dimensional array is generated, and an adjacent node of a node can be quickly indexed by using the two-dimensional array. The solution is applicable to large-scale graph data and has relatively high efficiency. When the solution is implemented based on a cluster, efficiency can be further improved.

BRIEF DESCRIPTION OF DRAWINGS

To describe technical solutions in implementations of the present specification or in the existing technology more clearly, the following briefly describes the accompanying drawings needed for describing the implementations or the existing technology. Apparently, the accompanying drawings in the following descriptions merely show some implementations recorded in the present specification, and a person of ordinary skill in the art can still derive other drawings from these accompanying drawings without creative efforts.

DESCRIPTION OF IMPLEMENTATIONS

Implementations of the present specification provide a random walk method, apparatus, and device, and a cluster-based random walk method, apparatus, and device.

To make a person skilled in the art better understand the technical solutions in the present specification, the following clearly describes the technical solutions in the implementations of the present specification with reference to the accompanying drawings in the implementations of the present specification. Apparently, the described implementations are merely some rather than all of the implementations of the present specification. All other implementations obtained by a person of ordinary skill in the art based on the implementations of the present specification without creative efforts shall fall within the protection scope of the present application.

The solution of the present specification is applicable to both cluster and stand-alone arrangements. Large-scale graph data can be processed more efficiently in a cluster because a task (for example, a data read task or a data synchronization task) can be split and then multiple machines in the cluster can execute in parallel parts of the task assigned to the machines. The following implementations are mainly described based on a cluster scenario.

Figure 1:
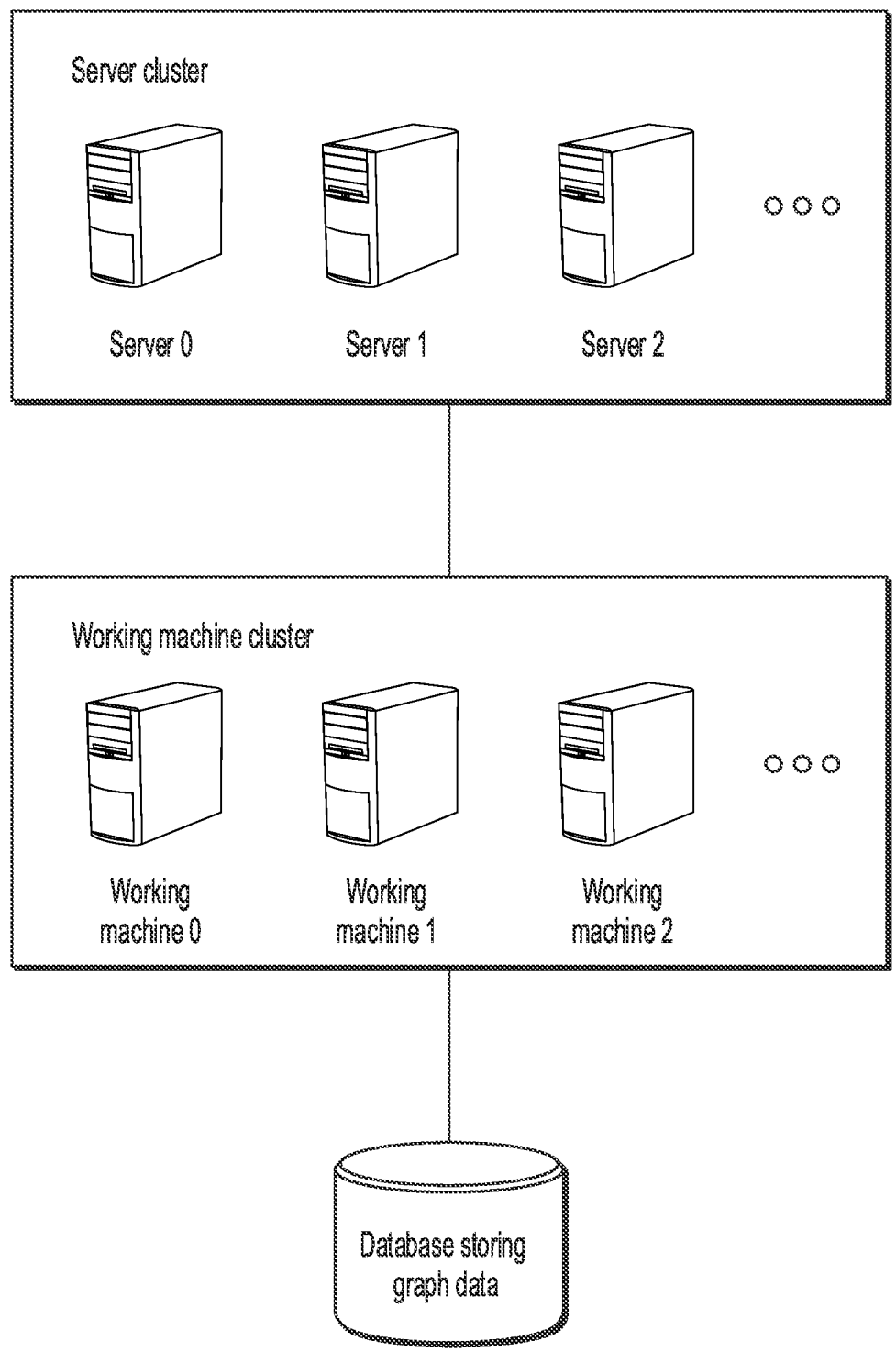
FIG. 1 is a schematic diagram illustrating an overall structure involved in the solution of the present specification in an actual application scenario.

The solution can involve one or more clusters, for example, involves two clusters as shown in FIG. 1.

FIG. 1 is a schematic diagram illustrating an overall structure involved in the solution of the present specification in an actual application scenario. The overall structure mainly involves three parts: a server cluster, a working machine cluster, and a database. The database stores graph data for cluster to read, and the server cluster and the working machine cluster cooperate with each other to implement random walk in the graph data based on data read from the database.

The structure in FIG. 1 is an example and not unique. For example, the solution can involve one cluster, and the cluster includes at least one scheduling machine and multiple working machines. For another example, the solution can involve one working machine cluster and one server, etc. The machines involved in the solution cooperate with each other to implement random walk in graph data.

The solution of the present specification is described in detail below.

Figure 2:
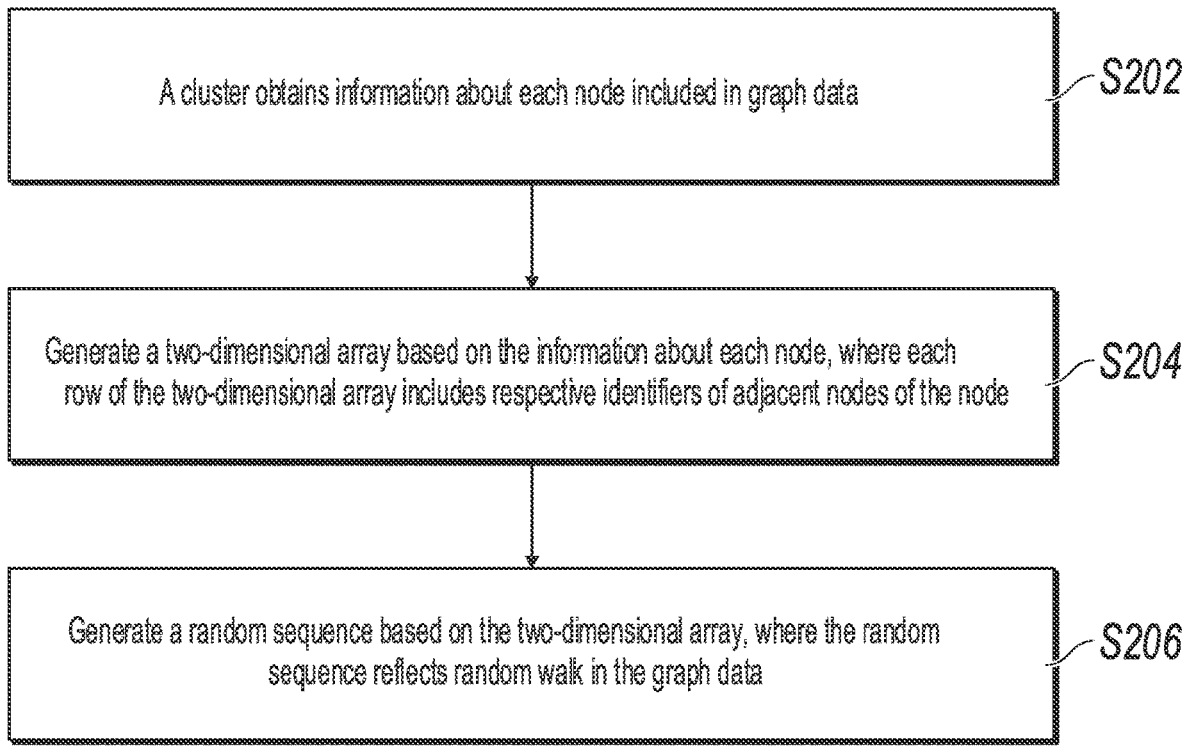
FIG. 2 is a schematic flowchart illustrating a cluster-based random walk method, according to an implementation of the present specification.

FIG. 2 is a schematic flowchart illustrating a cluster-based random walk method, according to an implementation of the present specification. Steps in FIG. 2 are executed by at least one machine in a cluster (or a program on the machine), and different steps can be executed by different machines.

A process in FIG. 2 includes the following steps:

S202. The cluster obtains information about each node included in graph data.

In this implementation of the present specification, information about a node can include an identifier of the node, an identifier of an adjacent node of the node (this is used as an example below), information other than the identifier that can indicate the adjacent node of the node, etc. Information about each node can be obtained at one time or at multiple times.

Generally, original graph data is stored in a database. In this case, the information about each node needs to be read by accessing the database. To alleviate increased burden on the database due to repeated data reading, multiple machines in the cluster can separately read information about some non-repeated nodes, and further, the multiple machines can read the database in parallel to quickly obtain the information about the nodes.

For example, all working machines in a working machine cluster can separately read information about some nodes from the database in parallel and process the information in parallel, and then synchronize processed data to a server cluster. Alternatively, all the working machines can directly synchronize the read node information to the server cluster, and the server cluster further processes the node information. The processing includes at least generating a two-dimensional array.

S204. Generate a two-dimensional array based on the information about each node, where each row of the two-dimensional array includes respective identifiers of adjacent nodes of the node.

In this implementation of the present specification, the two-dimensional array can be considered as a matrix, where each row of the matrix is a one-dimensional array.

Each row can correspond to one node, the row includes at least identifiers of adjacent nodes of the node corresponding to the row, and an identifier of each adjacent node can be a one-dimensional array element of the row. For ease of indexing, an identifier of the corresponding node can also be a one-dimensional array element of the row. For example, the identifier of the corresponding node is the 0th one-dimensional array element of the row, and the following one-dimensional array elements are sequentially the identifiers of the adjacent nodes of the node. Alternatively, the identifier of the node may not be included in the row, but only has an association relationship with the row, and the row can be indexed based on the association relationship by using the identifier of the node.

Based on the two-dimensional array and an identifier of any node, an identifier of any adjacent node of the node can be quickly indexed, thereby helping efficiently implement random walk in the graph data.

For ease of indexing, an identifier of each node is preferably a number. For example, value of an identifier of each node is used to define a position of the node in a sequence, and counting from 0, an identifier of a node ranked first is 0, an identifier of a node ranked second is 1, and so on. The following implementations are described based on the definition in this example.

Certainly, if original identifiers of the nodes are not numbers, the original identifiers can be mapped to numbers based on a one-to-one mapping rule, and then the numbers are used as identifiers of the nodes to generate the two-dimensional array.

S206. Generate a random sequence based on the two-dimensional array, where the random sequence reflects random walk in the graph data.

In this implementation of the present specification, the random sequence is a sequence formed by identifiers of multiple nodes, a sequence of the identifiers in the random sequence is a random walk sequence, and a maximum length of the random sequence generally depends on a predetermined quantity of random walk steps.

After the two-dimensional array is obtained, step S206 can be performed multiple times independently to obtain multiple random sequences independent of each other. For example, each working machine generates one or more random sequences based on the two-dimensional array.

The method in FIG. 2 helps reduce access to a database where original graph data is stored. It is unnecessary to rely on the database after a two-dimensional array is generated, and an adjacent node of a node can be quickly indexed by using the two-dimensional array. The solution is applicable to large-scale graph data and has relatively high efficiency. Because the method is implemented based on a cluster, efficiency can be further improved.

Based on the method in FIG. 2, this implementation of the specification further provides some specific implementation solutions of the method and extended solutions. The following uses the structure in FIG. 1 as an example for description.

In this implementation of the present specification, as previously described, the cluster can include a server cluster and a working machine cluster. Step S202 in which the cluster obtains information about each node included in graph data can specifically include: reading, by the working machine cluster, identifiers of adjacent nodes of each node included in the graph data from the database, where each working machine reads identifiers of adjacent nodes of some nodes. It is worthwhile to note that if the identifiers of the nodes are also unknown to the working machine cluster, the working machine cluster can read the identifiers of the nodes and read the identifiers of the adjacent nodes of the nodes based on the identifiers of the nodes (used as primary keys in the database).

For example, assume that there are five nodes with identifiers 0 to 4, respectively. The working machine cluster includes working machine 0, working machine 1, and working machine 2. Each working machine reads identifiers of adjacent nodes of some nodes from the database. For example, working machine 0 reads identifiers (0 and 2, respectively) of adjacent nodes of node 1 and identifiers (1, 3, and 4, respectively) of adjacent nodes of node 2, working machine 1 reads an identifier (1) of an adjacent node of node 0, and working machine 2 reads identifiers (2 and 4, respectively) of adjacent nodes of node 3 and identifiers (2 and 3, respectively) of adjacent nodes of node 4.

In this implementation of the present specification, each working machine can generate a non-full two-dimensional array (i.e., a two-dimensional array with one or more null elements) based on an identifier of an adjacent node whose identifier is read by the working machine and an identifier of a node corresponding to the adjacent node.

Further, the working machine cluster can synchronize all non-full two-dimensional arrays to the server cluster. Therefore, the server cluster can obtain a full two-dimensional array consisting of these non-full two-dimensional arrays. Specifically, the server cluster may obtain the full two-dimensional array by specially associating (for example, splitting or combining) these non-full two-dimensional arrays. Alternatively, the server cluster may not specifically associate these non-full two-dimensional arrays, but merely considers all the synchronized data as a whole, namely, the full two-dimensional array, after the working machine cluster synchronizes. Each server in the server cluster can store the full two-dimensional array, or can store only a part of the full two-dimensional array.

The two-dimensional array described in step S204 can be the full two-dimensional array, or can be the non-full two-dimensional array, or can be a two-dimensional array obtained after the full two-dimensional array is further processed (for example, re-sorted). The following implementations are mainly described by using the third case as an example. It is worthwhile to note that if the two-dimensional array described in step S204 is the non-full two-dimensional array, subsequent random walk is correspondingly performed on nodes (these nodes are merely some nodes in the graph data) involved in the non-full two-dimensional array. Any working machine can generate a random sequence based on a non-full two-dimensional array generated by the working machine, without necessarily relying on the synchronization and the server cluster described above.

An action after the synchronization is further described. The server cluster can further synchronize the full two-dimensional array to each working machine, so that the working machine can generate a random sequence based on the full two-dimensional array. As previously mentioned in the third case, the full two-dimensional array can be further processed by each working machine and then used to generate a random sequence.

For example, all rows of the full two-dimensional array can be sorted based on a node identifier sequence, and the random sequence can be generated based on a sorted two-dimensional array. For example, rank the row in which an identifier of node 0 and an identifier of an adjacent node of node 0 are located on the first row, rank the row in which an identifier of node 1 and identifiers of adjacent nodes of node 1 are located on the second row, and so on. Further, the identifier of node 0 can be removed from the first row with only the identifier of the adjacent node kept, and an association relationship between node 0 and a processed first row can be established, to subsequently index an identifier of any adjacent node in the first row based on the identifier of node 0. By analogy, identifiers of only adjacent nodes can be kept in each processed row.

In this implementation of the present specification, the quantity of one-dimensional array elements is equal in each processed row, and the quantity of elements is generally not less than a quantity of adjacent nodes of a node with the largest quantity of adjacent nodes among all the nodes. For a row that cannot be filled with an identifier of an adjacent node, an empty element (namely, a "null" element) can be filled at the end of the row. In addition, if only an individual node has a large quantity of adjacent nodes, and the other nodes each have a quantity of adjacent nodes much less than the quantity of adjacent nodes of the individual node, a quantity of one-dimensional array elements in each processed row can be defined with reference to the other nodes. For adjacent nodes of the individual node, only identifiers of some of the adjacent nodes may be selected as elements of a row corresponding to the individual node, to alleviate an unnecessary waste of a large amount of memory.

Figure 3:
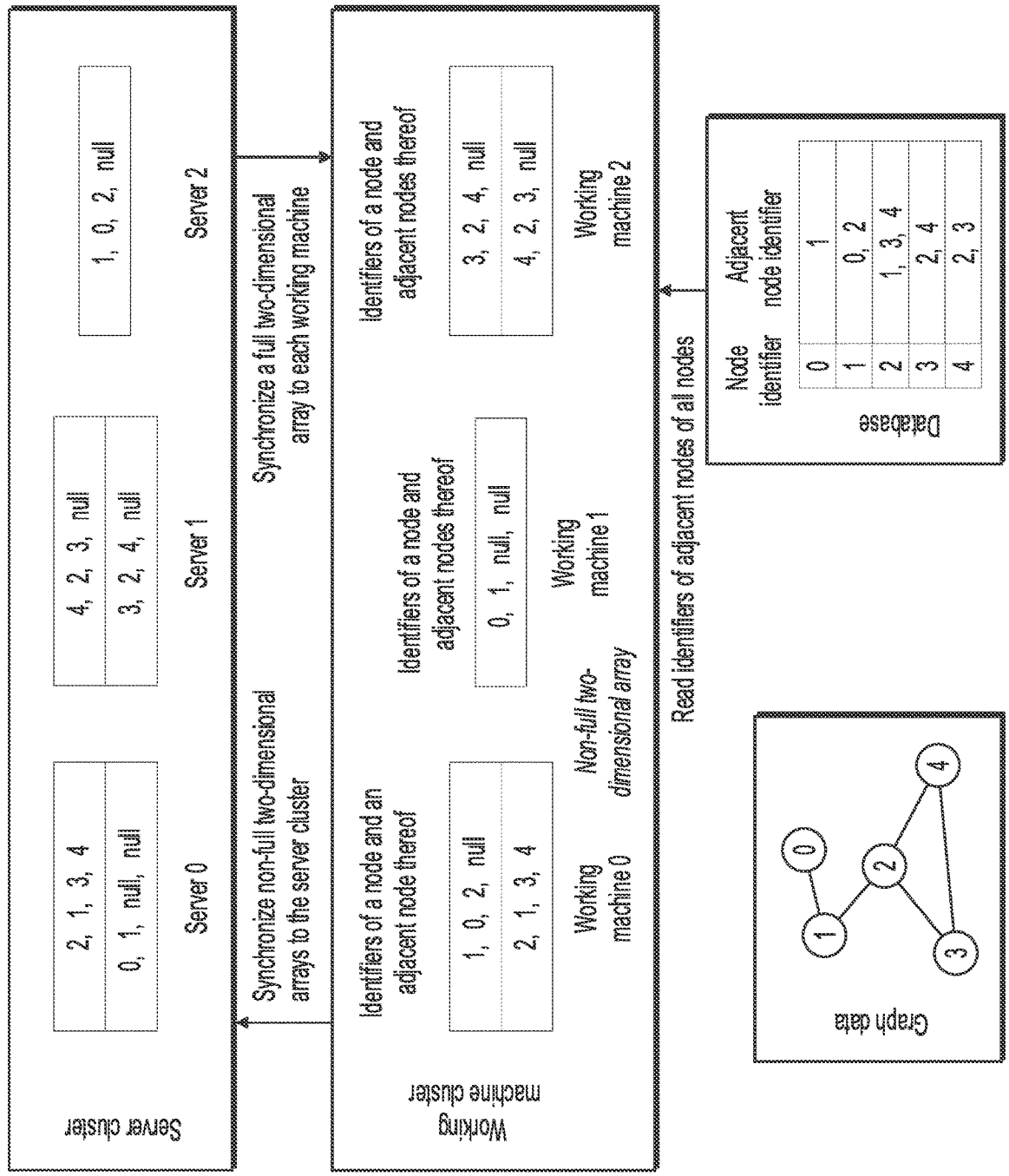
FIG. 3 is a schematic diagram illustrating a cluster-based two-dimensional array generation process in an actual application scenario, according to an implementation of the present specification.

Based on the previous descriptions, as shown in FIG. 3, an implementation of the present specification provides a schematic diagram illustrating a cluster-based two-dimensional array generation process in an actual application scenario.

In FIG. 3, in a data table in a database, identifiers of nodes are used as primary keys to record identifiers of adjacent nodes of each node, where an adjacent node of node 0 is node 1, adjacent nodes of node 1 are node 0 and node 2, adjacent nodes of node 2 are node 1, node 3, and node 4, adjacent nodes of node 3 are node 2 and node 4, and adjacent nodes of node 4 are node 2 and node 3. As previously described, in some implementations, working machines 0 to 2 can separately read identifiers of adjacent nodes of some nodes from the database in parallel.

Each working machine correspondingly generates a non-full two-dimensional array based on identifiers read by the working machine. A two-dimensional array generated by working machine 0 includes two rows, a two-dimensional array generated by working machine 1 includes one row, and a two-dimensional array generated by working machine 2 includes two rows. Each row of the non-full two-dimensional array includes both an identifier of a node and an identifier of each adjacent node of the node.

A working cluster synchronizes all generated non-full two-dimensional arrays to a server cluster. It can be seen that the server cluster obtains a full two-dimensional array and stores the full two-dimensional array in parts in servers 0 to 2.

The server cluster synchronizes the full two-dimensional array to each working machine. Then, each working machine can independently sort the full two-dimensional array and remove node identifiers from the full two-dimensional array, to obtain an ordered two-dimensional array including only identifiers of adjacent nodes, for generating a random sequence.

In this implementation of the present specification, for step S206, the generating a random sequence based on the two-dimensional array can specifically include: randomly determining, by the working machine, an identifier from identifiers of each node as an identifier of a target node; indexing a corresponding row from the two-dimensional array based on the identifier of the target node, where the corresponding row includes the identifier of the target node and an identifier of an adjacent node of the target node; determining a quantity of identifiers of adjacent nodes included in the corresponding row; randomly determining a non-negative integer less than the quantity, and obtaining an identifier of the Kth adjacent node included in the corresponding row, where K is the non-negative integer; and generating the random sequence consisting of identifiers of all sequentially obtained target nodes by performing iterative calculation by using the Kth adjacent node as a new target node.

Figure 4:
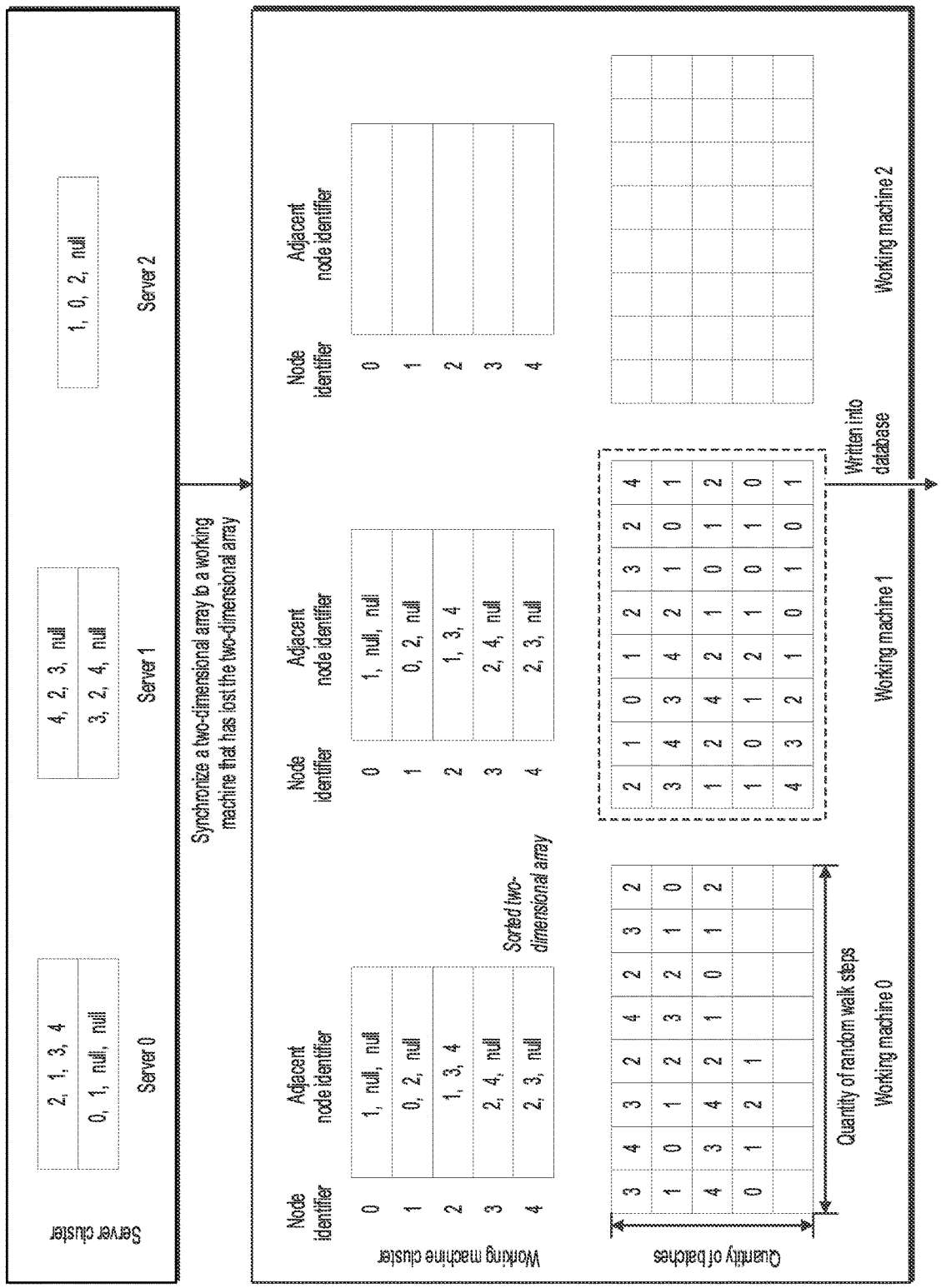
FIG. 4 is a schematic diagram illustrating a cluster-based random sequence generation process in an actual application scenario, according to an implementation of the present specification.

Further, the example in FIG. 3 is still used for description with reference to FIG. 4. FIG. 4 is a schematic diagram illustrating a cluster-based random sequence generation process in an actual application scenario, according to an implementation of the present specification.

Assume that the graph data includes N nodes in total, an identifier of the mth node is m, $0 \leq m \leq N-1$, the target node is the ith node, and the corresponding row is the ith row of the two-dimensional array. The corresponding row is a one-dimensional array, an identifier of the nth adjacent node of the target node is the nth element of the one-dimensional array, n is counted from 0, and the non-negative integer is denoted as j.

In FIG. 4, N=5, the two-dimensional array (referred to as an adjacent node array) obtained by the working machine after processing the full two-dimensional array synchronized by the server cluster correspondingly includes five rows, and the five rows sequentially correspond to nodes 0 to 4. Each row is a one-dimensional array. The one-dimensional array includes an identifier of each adjacent node of a node corresponding to the one-dimensional array, and an insufficient part is filled with a "null" element.

The working machine randomly generates an integer that belongs to [0,N−1=4], that is, the working machine randomly determines an identifier of a target node from the identifiers of all the nodes; indexes the ith row (a one-dimensional array) from the adjacent node array based on the identifier i of the target node; determines a quantity of non-"null" elements included in the ith row; randomly determines a non-negative integer j that is less than the quantity of elements; and obtains an identifier of the jth adjacent node of the target node by reading the jth element of the ith row.

Assume that the identifier of the target node is 2, and j=1. In this case, the target node is node 2, the ith row is [1, 3, 4], an obtained identifier of the first adjacent node of the target node is the $1^{st}$ element, namely, 3, of the array. Therefore, random walk from node 2 to node 3 is implemented, and then node 3 is used as a target node for iterative calculation, to continue random walk. As such, identifiers of multiple nodes that are sequentially passed through form a random sequence.

In FIG. 4, a quantity of random walk steps is predetermined as 8 and a quantity of batches is predetermined as 5. For example, if a matrix is used for representation, the quantity of random walk steps is a quantity of columns of the matrix, the quantity of batches is a quantity of rows of the matrix, and each row of the matrix can store a random sequence.

The quantity of random walk steps defines a maximum length of a random sequence. Each time the random sequence reaches the maximum length, a next random sequence can start to be generated without relying on the random sequence.

The quantity of batches defines a maximum quantity of random sequences generated by each working machine before the working machine writes generated random sequences to the database. When the maximum quantity is reached, the working machine can write, into the database, multiple unwritten random sequences (represented as corresponding matrices) that have been generated by the working machine. For example, if a quantity of unwritten random sequences currently generated by working machine 2 in FIG. 4 reaches a maximum quantity 5, corresponding matrices can be written into the database.

The first random sequence (3, 4, 3, 2, 4, 2, 3, 2) generated by working machine 0 in FIG. 4 is used as an example. The random sequence represents a random walk process that sequentially passes through the following nodes: node 3, node 4, node 3, node 2, node 4, node 2, node 3, and node 2.

Further, a threshold can be predetermined, to limit a maximum total quantity of random sequences generated by the entire working machine cluster. When the determined threshold is reached, all the working machines can stop generating random sequences.

In addition, in practice, some working machines in the working machine cluster may be abnormal, resulting in a loss of the two-dimensional array previously used to generate a random sequence. For example, if the working machine stores the two-dimensional array only in memory, the data in the memory will be lost after a breakdown. In this case, when the working machine returns to normal, the full two-dimensional array can be re-obtained from the server cluster and used to generate a random sequence after being processed. This case is shown by using working machine 2 in FIG. 4.

The solution in the present specification is described above mainly based on the cluster scenario. Alternatively, the solution in the present specification can be described without the cluster scenario. For example, based on the same idea, as shown in FIG. 5, an implementation of the present specification further provides a schematic flowchart of a random walk method.

Figure 5:
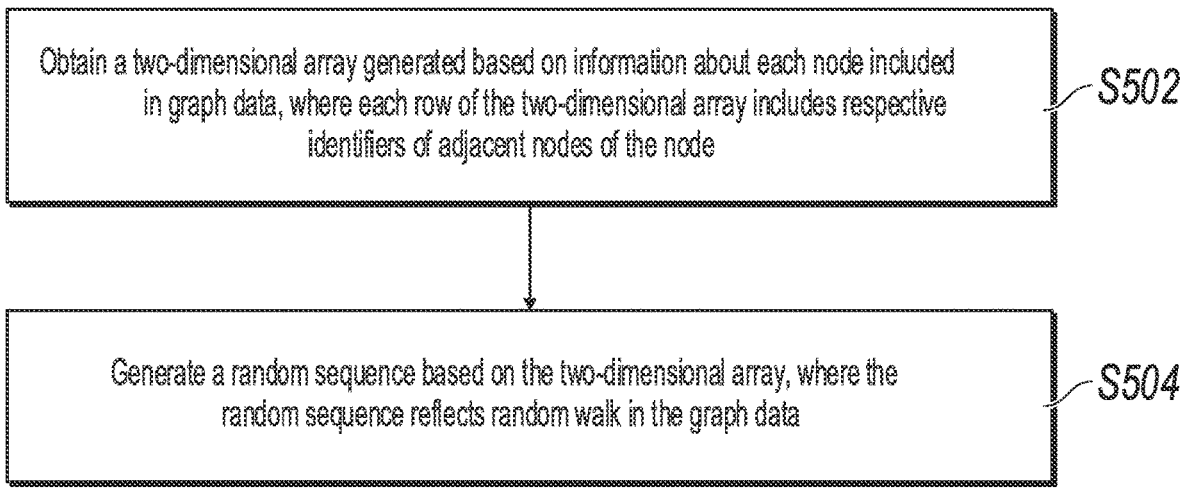
FIG. 5 is a schematic flowchart illustrating a random walk method, according to an implementation of the present specification.

A process in FIG. 5 can be executed by a single computing device or multiple computing devices. The process includes the following steps:

S502. Obtain a two-dimensional array generated based on information about each node included in graph data, where each row of the two-dimensional array includes respective identifiers of adjacent nodes of the node.

In step S502, a specific machine that generates the two-dimensional array is not limited in this application. Generally, provided that the graph data does not change, the two-dimensional array generated based on the graph data can always be reused.

S504. Generate a random sequence based on the two-dimensional array, where the random sequence reflects random walk in the graph data.

Figure 6:
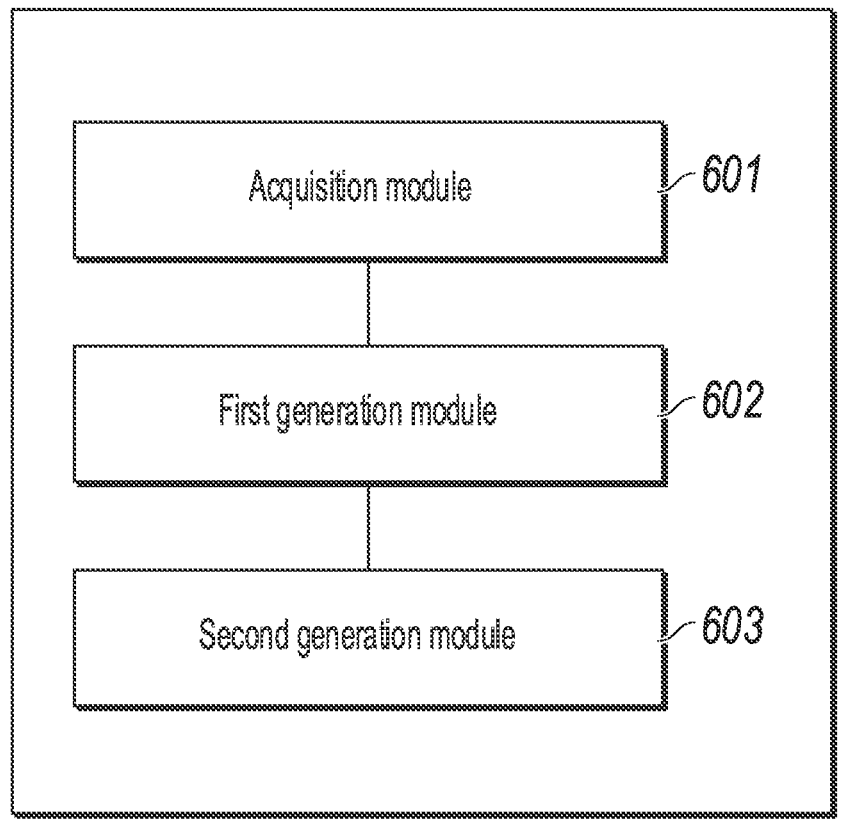
FIG. 6 is a schematic structural diagram illustrating a cluster-based random walk apparatus corresponding to FIG. 2, according to an implementation of the present specification.
Figure 7:
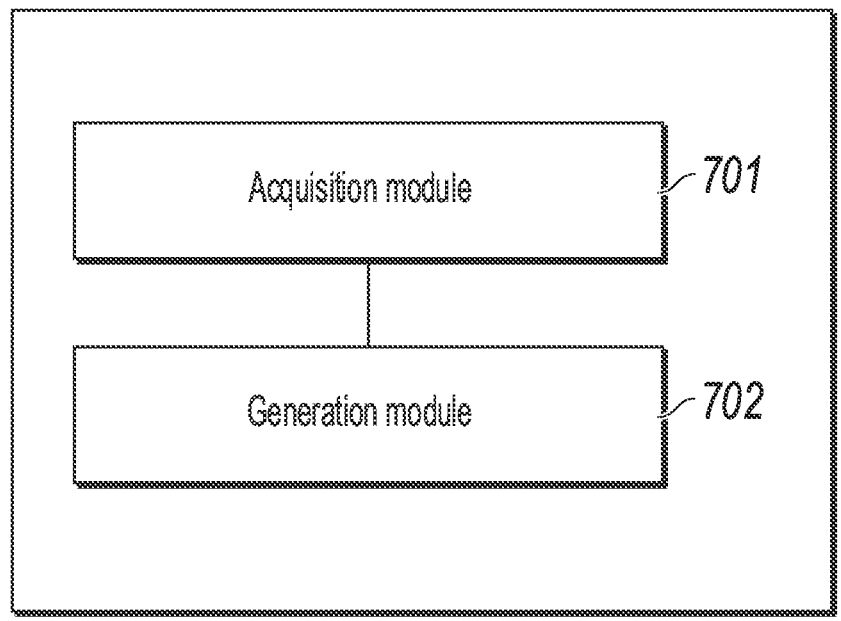
FIG. 7 is a schematic structural diagram illustrating a random walk apparatus corresponding to FIG. 5, according to an implementation of the present specification.

Based on the same idea, as shown in FIG. 6 and FIG. 7, the implementations of the present specification further provide apparatuses corresponding to the previous methods.

FIG. 6 is a schematic structural diagram illustrating a cluster-based random walk apparatus corresponding to FIG. 2, according to an implementation of the present specification. The apparatus belongs to a cluster and includes: acquisition module 601, configured to obtain information about each node included in graph data; first generation module 602, configured to generate a two-dimensional array based on the information about each node, where each row of the two-dimensional array includes respective identifiers of adjacent nodes of the node; and second generation module 603, configured to generate a random sequence based on the two-dimensional array, where the random sequence reflects random walk in the graph data.

Optionally, the cluster includes a server cluster and a working machine cluster; and acquisition module 601 is configured to obtain information about each node included in graph data, specifically including: reading, by the working machine cluster, identifiers of adjacent nodes of each node included in the graph data from a database, where each working machine reads identifiers of adjacent nodes of some nodes.

Optionally, first generation module 602 is configured to generate a two-dimensional array based on the information about each node, specifically including: generating, by each working machine, a non-full two-dimensional array based on an identifier of an adjacent node whose identifier is read by the working machine and an identifier of a node corresponding to the adjacent node; synchronizing, by the working machine cluster, all non-full two-dimensional arrays to the server cluster; and obtaining, by the server cluster, a full two-dimensional array based on all the non-full two-dimensional arrays.

Optionally, before second generation module 603 generates the random sequence based on the two-dimensional array, the server cluster synchronizes the full two-dimensional array to each working machine, so that the working machine generates a random sequence based on the full two-dimensional array.

Optionally, second generation module 603 is configured to generate a random sequence based on the two-dimensional array, specifically including: sorting, by the working machine, all rows of the full two-dimensional array based on a node identifier sequence; and generating the random sequence based on a sorted two-dimensional array.

Optionally, second generation module 603 is configured to generate a random sequence based on the two-dimensional array, specifically including: randomly determining, by the working machine, an identifier from identifiers of each node as an identifier of a target node; indexing a corresponding row from the two-dimensional array based on the identifier of the target node, where the corresponding row includes the identifier of the target node and an identifier of an adjacent node of the target node; determining a quantity of identifiers of adjacent nodes included in the corresponding row; randomly determining a non-negative integer less than the quantity, and obtaining an identifier of the Kth adjacent node included in the corresponding row, where K is the non-negative integer; and generating the random sequence consisting of identifiers of all sequentially obtained target nodes by performing iterative calculation by using the Kth adjacent node as a new target node.

Optionally, there are N nodes in total, an identifier of the mth node is m, $0 \leq m \leq N-1$, the target node is the ith node, and the corresponding row is the ith row of the two-dimensional array.

Optionally, the corresponding row is a one-dimensional array, an identifier of the nth adjacent node of the target node is the nth element of the one-dimensional array, and n is counted from 0; and the non-negative integer is denoted as j, and the obtaining, by the working machine, an identifier of the Kth adjacent node included in the corresponding row specifically includes: obtaining, by the working machine, an identifier of the jth adjacent node of the target node by reading the jth element of the one-dimensional array.

Optionally, a total quantity of elements of the one-dimensional array is equal to a quantity of adjacent nodes of a node with the largest quantity of adjacent nodes among all the nodes.

Optionally, the generating, by the working machine, the random sequence consisting of identifiers of all sequentially obtained target nodes specifically includes: generating, by the working machine, the random sequence consisting of the identifiers of all the sequentially obtained target nodes when a total quantity of sequentially obtained target nodes reaches a predetermined quantity of random walk steps.

Optionally, second generation module 603 is configured to generate a random sequence, specifically including: generating, by each working machine, a random sequence until a total quantity of generated random sequences reaches a determined threshold.

Optionally, the working machine re-obtains the two-dimensional array from the server cluster if the local existing two-dimensional array is lost.

FIG. 7 is a schematic structural diagram illustrating a random walk apparatus corresponding to FIG. 5, according to an implementation of the present specification. The apparatus includes: acquisition module 701, configured to obtain a two-dimensional array generated based on information about each node included in graph data, where each row of the two-dimensional array includes respective identifiers of adjacent nodes of the node; and generation module 702, configured to generate a random sequence based on the two-dimensional array, where the random sequence reflects random walk in the graph data.

Based on the same idea, an implementation of the present specification further provides a cluster-based random walk device corresponding to FIG. 2. The device belongs to a cluster and includes: at least one process the memory stores instructions that can be executed by the at least one processor, and the instructions are executed by the at least one processor to enable the at least one processor to: obtain information about each node included in graph data; generate a two-dimensional array based on the information about each node, where each row of the two-dimensional array includes respective identifiers of adjacent nodes of the node; and generate a random sequence based on the two-dimensional array, where the random sequence reflects random walk in the graph data.

Based on the same idea, an implementation of the present specification further provides a random walk device corresponding to FIG. 5. The device includes: at least one processor; and a memory in communication with the at least one processor, where the memory stores instructions that can be executed by the at least one processor, and the instructions are executed by the at least one processor to enable the at least one processor to: obtain a two-dimensional array generated based on information about each node included in graph data, where each row of the two-dimensional array includes respective identifiers of adjacent nodes of the node; and generate a random sequence based on the two-dimensional array, where the random sequence reflects random walk in the graph data.

Based on the same idea, an implementation of the present specification further provides one or more non-transitory computer storage media corresponding to FIG. 2. The non-transitory computer storage medium stores a computer executable instruction, and the computer executable instruction is set to: obtain information about each node included in graph data; generate a two-dimensional array based on the information about each node, where each row of the two-dimensional array includes respective identifiers of adjacent nodes of the node; and generate a random sequence based on the two-dimensional array, where the random sequence reflects random walk in the graph data.

Based on the same idea, an embodiment of this specification further provides one or more non-transitory computer storage media corresponding to FIG. 5. The non-transitory computer storage medium stores a computer executable instruction, and the computer executable instruction is set to: obtain a two-dimensional array generated based on information about each node included in graph data, where each row of the two-dimensional array includes respective identifiers of adjacent nodes of the node; and generate a random sequence based on the two-dimensional array, where the random sequence reflects random walk in the graph data.

Particular implementations of the present specification are described above. Other implementations fall within the scope of the appended claims. In some situations, the actions or steps recorded in the claims can be performed in an order different from the order in the implementations and the desired results can still be achieved. In addition, the processes depicted in the accompanying drawings do not necessarily require the shown particular execution order to achieve the desired results. In some implementations, multitasking and parallel processing can or may be advantageous.

The implementations in the present specification are described in a progressive way. For same or similar parts of the implementations, mutual references can be made to the implementations. Each implementation focuses on a difference from other implementations. Especially, an apparatus implementation, a device implementation, and a non-transitory computer storage medium implementation are basically similar to a method implementation, and therefore are described briefly. For a related part, references can be made to some descriptions in the method implementation.

The apparatus, the device, and the non-transitory computer storage medium provided in the implementations of the present specification correspond to the method. Therefore, the apparatus, the device, and the non-transitory computer storage medium also have similar beneficial technical effects to the corresponding method. The beneficial technical effects of the method is described in detail above, and therefore the beneficial technical effects of the corresponding apparatus, device, and non-transitory computer storage medium are omitted here.

In the 1990s, whether a technical improvement is a hardware improvement (for example, an improvement to circuit structures, such as a diode, a transistor, or a switch) or a software improvement (an improvement to a method procedure) can be clearly distinguished. However, as technologies develop, current improvements to many method processes can be considered as direct improvements to hardware circuit structures. Almost all designers program an improved method process into a hardware circuit, to obtain a corresponding hardware circuit structure. Therefore, a method process can be improved by using a hardware entity module. For example, a programmable logic device (PLD) (for example, a field programmable gate array (FPGA)) is such an integrated circuit, and a logical function of the PLD is determined by a user through device programming. A designer "integrates" a digital system to a single PLD through self-programming, without requiring a chip manufacturer to design and manufacture a dedicated integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language before being compiled. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). At present, the Very-High-Speed Integrated Circuit Hardware Description Language (VHDL) and Verilog are most commonly used. A person skilled in the art should also understand that a hardware circuit that implements a logical method process can be readily obtained provided that the method process is logically programmed by using several of the previously described hardware description languages and is programmed into an integrated circuit.

A controller can be implemented by using any appropriate method. For example, the controller can be in a form of a microprocessor or a processor, or a computer-readable medium that stores computer-readable program codes (such as software or firmware) that can be executed by the microprocessor or the processor, a logic gate, a switch, an application-specific integrated circuit (ASIC), a programmable logic controller, or a built-in microcontroller. Examples of the controller include but are not limited to the following microcontrollers: ARC 625D, Atmel AT91SAM, Microchip PIC18F26K20, and Silicone Labs C8051F320. A memory controller can be further implemented as a part of control logic of a memory. A person skilled in the art also knows that, in addition to implementing the controller by using the computer-readable program code, method steps can be logically programmed to allow the controller to implement the same function in forms of a logic gate, a switch, an application-specific integrated circuit, a programmable logic controller, and a built-in microcontroller. Therefore, such a controller can be considered as a hardware component, and an apparatus that is included in the controller and configured to implement various functions can also be considered as a structure in the hardware component. Alternatively, the apparatus configured to implement various functions can even be considered as both a software module implementing a method and a structure in the hardware component.

The system, apparatus, module, or unit illustrated in the previous implementations can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the previous apparatus is divided to various units based on functions for description when the previous apparatus is described. Certainly, when the present specification is implemented, functions of the units can be implemented in one or more pieces of software and/or hardware.

A person skilled in the art should understand that the implementations of the present specification can be provided as a method, a system, or a computer program product. Therefore, the implementations of the present specification can be in a form of hardware only implementations, software only implementations, or implementations with a combination of software and hardware. In addition, the implementations of the present specification can be in a form of a computer program product that is implemented on one or more computer-usable storage media (including but not limited to a magnetic disk memory, a CD-ROM, an optical memory, etc.) that include computer-usable program code.

The present specification is described with references to the flowcharts and/or block diagrams of the method, the device (system), and the computer program product according to the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of other programmable data processing devices to generate a machine, so that the instructions executed by the computer or the processor of the other programmable data processing devices generate an apparatus for implementing a specified function in one or more processes in the flowcharts and/or in one or more blocks in the block diagrams.

Alternatively, these computer program instructions can be stored in a computer-readable memory that can instruct the computer or the other programmable data processing devices to work in a specific way, so that the instructions stored in the computer-readable memory generate an artifact that includes an instruction apparatus. The instruction apparatus implements a specified function in one or more processes in the flowcharts and/or in one or more blocks in the block diagrams.

Alternatively, these computer program instructions can be loaded onto the computer or other programmable data processing devices, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

In a typical configuration, a computing device includes one or more processors (CPUs), input/output interfaces, network interfaces, and memories.

The memory may include a non-persistent memory, a random access memory (RAM), a non-transitory memory, and/or another form in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of the computer storage medium include but are not limited to a phase-change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device, or any other non-transmission medium. The computer storage medium can be configured to store information accessible to a computing device. As described in the present specification, the computer-readable medium does not include computer-readable transitory media such as a modulated data signal and a carrier.

It is worthwhile to further note that, the terms "comprise" and "include", or any other variants thereof are intended to cover a non-exclusive inclusion, so that a process, method, product, or device that includes a list of elements not only includes those elements but also includes other elements that are not expressly listed, or further includes elements inherent to such process, method, product, or device. Without more constraints, an element preceded by "includes a . . . " does not preclude the existence of additional identical elements in the process, method, product, or device that includes the element.

The present specification can be described in the general context of a computer executable instruction executed by a computer, for example, a program module. Generally, the program module includes a routine, a program, an object, a component, a data structure, etc. executing a specific task or implementing a specific abstract data type. The present specification can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are described in a progressive way. For same or similar parts of the implementations, mutual references can be made to the implementations. Each implementation focuses on a difference from other implementations. Especially, a system implementation is basically similar to a method implementation, and therefore is described briefly. For a related part, references can be made to some descriptions in the method implementation.

The previous descriptions are merely implementations of the present specification, and are not intended to limit the present application. A person skilled in the art can make various modifications and changes to the present application. Any modification, equivalent replacement, improvement, etc. made without departing from the spirit and principle of the present application shall fall within the scope of the claims of the present application.

What is claimed is:

1. A method for performing cluster-based random walk, comprising:
    obtaining, by each working machine in a working machine cluster, data describing a respective portion of a graph comprising nodes and comprising edges between the nodes, wherein each working machine in the working machine cluster comprises one or more processors;
    synchronizing, by each working machine in the working machine cluster, the data describing the respective portion of the graph with a server cluster to provide synchronized data;
    generating a full two-dimensional array based on the synchronized data, wherein generating the full two-dimensional array comprises
        generating, by each working machine in the working machine cluster, a non-full two-dimensional array based on respective identifiers of (i) adjacent nodes whose identifiers are read by the working machine and (ii) a node connected to the adjacent nodes,
        synchronizing, by the server cluster, the non-full two-dimensional arrays generated by the working machines of the working machine cluster, and
        generating, by the server cluster, the full two-dimensional array based on all the non-full two-dimensional arrays;
    synchronizing the full two-dimensional array across the working machine cluster to provide a synchronized two-dimensional array; and
    generating, by each working machine in the working machine cluster, a random sequence, respectively, based on the synchronized two-dimensional array, wherein generating the random sequence comprises
        generating a sorted two-dimensional array by sorting all rows of the full two-dimensional array based on a sequence of respective identifiers of the nodes, and
        generating the random sequence based on the sorted two-dimensional array.

2. The method according to claim 1, wherein obtaining the data describing the graph comprises:
    reading, by the working machine cluster and from a database, respective identifiers of adjacent nodes of each node included in the graph, wherein each working machine reads respective identifiers of adjacent nodes of at least some of the nodes included in the graph.

3. The method according to claim 1, wherein the generating the random sequence comprises:
    determining, by the working machine, an identifier from respective identifiers of the nodes included in the graph as a target node identifier;
    determining a corresponding row from the synchronized two-dimensional array based on the target node identifier, wherein the corresponding row comprises the target node identifier and respective adjacent node identifiers of adjacent nodes of a target node;
    determining a quantity of adjacent node identifiers included in the corresponding row;
    determining a non-negative integer K that is less than a value of the quantity of adjacent node identifiers in the corresponding row;
    obtaining a Kth adjacent node identifier of a Kth adjacent node included in the corresponding row; and
    generating the random sequence that includes the Kth adjacent node identifier.

4. The method according to claim 3, wherein there are N nodes in total, an identifier of a mth node is m, $0 \le m \le N-1$, the target node is a ith node, and the corresponding row is an ith row of the full two-dimensional array.

5. The method according to claim 3, wherein the corresponding row is a one-dimensional array, an identifier of a nth adjacent node of the target node is a nth element of the one-dimensional array, and n is counted from 0; and
    the non-negative integer K is denoted as j, and the obtaining the Kth adjacent node identifier of the Kth adjacent node included in the corresponding row comprises:
        obtaining an adjacent node identifier of a jth adjacent node of the target node by reading a jth element of the one-dimensional array.

6. The method according to claim 5, wherein a total quantity of elements of the one-dimensional array is equal to a quantity of adjacent nodes of a node with the largest quantity of adjacent nodes among all the nodes.

7. The method according to claim 3, wherein the generating the random sequence that includes the Kth adjacent node identifier comprises:
    generating the random sequence that includes the Kth adjacent node identifier when a total quantity of target nodes reaches a predetermined quantity of random walk steps.

8. The method according to claim 1, wherein the generating the random sequence comprises:
    generating, by each working machine in the working machine cluster, a different random sequence until a total quantity of generated random sequences reaches a determined threshold.

9. The method according to claim 1, wherein synchronizing the full two-dimensional array across the working machines in the working machine cluster comprises:
    re-obtaining the full two-dimensional array from the server cluster when a local copy of the full two-dimensional array is lost.

10. A non-transitory, computer-readable medium storing one or more instructions executable by a computer system comprising a working machine cluster to perform operations comprising:

obtaining, by each working machine in a working machine cluster, data describing a respective portion of a graph comprising nodes and comprising edges between the nodes, wherein each working machine in the working machine cluster comprises one or more processors;

synchronizing, by each working machine in the working machine cluster, the data describing the respective portion of the graph with a server cluster to provide synchronized data;

generating a full two-dimensional array based on the synchronized data, wherein generating the full two-dimensional array comprises;

generating, by each working machine in the working machine cluster, a non-full two-dimensional array based on respective identifiers of (i) adjacent nodes whose identifiers are read by the working machine and (ii) a node connected to the adjacent nodes, synchronizing, by the server cluster, the non-full two-dimensional arrays generated by the working machines of the working machine cluster, and generating, by the server cluster, the full two-dimensional array based on all the non-full two-dimensional arrays;

synchronizing the full two-dimensional array across the working machine cluster to provide a synchronized two-dimensional array; and generating, by each working machine in the working machine cluster, a random sequence, respectively, based on the synchronized two-dimensional array, wherein generating the random sequence comprises generating a sorted two-dimensional array by sorting all rows of the full two-dimensional array based on a sequence of respective identifiers of the nodes, and generating the random sequence based on the sorted two-dimensional array.

11. The non-transitory, computer-readable medium according to claim 10, wherein obtaining the data describing the graph comprises:

reading, by the working machine cluster and from a database, respective identifiers of adjacent nodes of each node included in the graph, wherein each working machine reads respective identifiers of adjacent nodes of at least some of the nodes included in the graph.

12. The non-transitory, computer-readable medium according to claim 10, wherein the generating the random sequence comprises:

determining, by the working machine, an identifier from respective identifiers of the nodes included in the graph as a target node identifier;

determining a corresponding row from the synchronized two-dimensional array based on the target node identifier, wherein the corresponding row comprises the target node identifier and respective adjacent node identifiers of adjacent nodes of a target node;

determining a quantity of adjacent node identifiers included in the corresponding row;

determining a non-negative integer K that is less than a value of the quantity of adjacent node identifiers in the corresponding row;

obtaining a Kth adjacent node identifier of a Kth adjacent node included in the corresponding row; and generating the random sequence that includes the Kth adjacent node identifier.

13. A computer-implemented system, comprising
a working machine cluster, wherein the working machine cluster comprises one or more computers and comprises one or more computer memory devices interoperably coupled with the one or more computers and having tangible, non-transitory, machine-readable media storing one or more instructions that, when executed by the one or more computers, perform one or more operations comprising:

obtaining, by each working machine in a working machine cluster, data describing a respective portion of a graph comprising nodes and comprising edges between the nodes, wherein each working machine in the working machine cluster comprises one or more processors;

synchronizing, by each working machine in the working machine cluster, the data describing the respective portion of the graph with a server cluster to provide synchronized data;

generating a full two-dimensional array based on the synchronized data, wherein generating the full two-dimensional array comprises generating, by each working machine in the working machine cluster, a non-full two-dimensional array based on respective identifiers of (i) adjacent nodes whose identifiers are read by the working machine and (ii) a node connected to the adjacent nodes, synchronizing, by the server cluster, the non-full two-dimensional arrays generated by the working machines of the working machine cluster, and generating, by the server cluster, the full two-dimensional array based on all the non-full two-dimensional arrays;

synchronizing the full two-dimensional array across the working machine cluster to provide a synchronized two-dimensional array; and generating, by each working machine in the working machine cluster, a random sequence, respectively, based on the synchronized two-dimensional array, wherein generating the random sequence comprises generating a sorted two-dimensional array by sorting all rows of the full two-dimensional array based on a sequence of respective identifiers of the nodes, and generating the random sequence based on the sorted two-dimensional array.

14. The computer-implemented system according to claim 13, wherein obtaining the data describing the graph comprises:

reading, by the working machine cluster and from a database, respective identifiers of adjacent nodes of each node included in the graph, wherein each working machine reads respective identifiers of adjacent nodes of at least some of the nodes included in the graph.

15. The computer-implemented system according to claim 13, wherein the generating the random sequence comprises:

determining, by the working machine, an identifier from respective identifiers of the nodes included in the graph as a target node identifier;

determining a corresponding row from the synchronized two-dimensional array based on the target node identifier, wherein the corresponding row comprises the target node identifier and respective adjacent node identifiers of adjacent nodes of a target node;

determining a quantity of adjacent node identifiers included in the corresponding row;

determining a non-negative integer K that is less than a value of the quantity of adjacent node identifiers in the corresponding row;

obtaining a Kth adjacent node identifier of a Kth adjacent node included in the corresponding row; and generating the random sequence that includes the Kth adjacent node identifier.

* * * * *